US008727840B2

(12) United States Patent
Connor et al.

(10) Patent No.: US 8,727,840 B2
(45) Date of Patent: May 20, 2014

(54) METHOD OF CUTTING A PORK LOIN

(75) Inventors: Paul Thomas Connor, LeMars, IA (US); Edward J. Yancey, II, Huntsville, AR (US)

(73) Assignee: Tyson Foods, Inc., Springdale, AR (US)

( * ) Notice: Subject to any disclaimer, the term of this patent is extended or adjusted under 35 U.S.C. 154(b) by 193 days.

(21) Appl. No.: 13/460,564

(22) Filed: Apr. 30, 2012

(65) Prior Publication Data
US 2013/0288584 A1    Oct. 31, 2013

(51) Int. Cl.
*A22C 18/00*    (2006.01)

(52) U.S. Cl.
USPC ........................................................ 452/171

(58) Field of Classification Search
USPC ......... 452/135, 136, 141, 144, 172, 160, 149, 452/155, 156, 174
See application file for complete search history.

(56) References Cited

U.S. PATENT DOCUMENTS

| | | | |
|---|---|---|---|
| 3,594,189 A | 7/1971 | Panattoni | |
| 3,946,461 A | 3/1976 | Martin | |
| 4,019,223 A | 4/1977 | Baker | |
| 4,067,085 A | 1/1978 | Gasbarro | |
| 4,083,083 A | 4/1978 | Duncan et al. | |
| 4,229,859 A | 10/1980 | Gagliardi, Jr. et al. | |
| 4,306,335 A | 12/1981 | Hawk et al. | |
| 4,328,569 A * | 5/1982 | Trott et al. | 367/103 |
| 4,424,608 A | 1/1984 | Martin | |
| 4,503,587 A | 3/1985 | Martin | |
| 4,536,919 A | 8/1985 | Cashwell et al. | |
| 4,589,165 A | 5/1986 | Lerner et al. | |
| 4,669,148 A | 6/1987 | Scheier | |
| 4,715,092 A | 12/1987 | Lerner et al. | |
| 4,745,658 A | 5/1988 | Lerner | |
| RE32,697 E | 6/1988 | Hazenbroek et al. | |
| 4,930,187 A | 6/1990 | Whittington | |
| 4,993,115 A | 2/1991 | Hazenbroek | |
| 5,021,024 A | 6/1991 | Villemin et al. | |
| 5,088,957 A | 2/1992 | Gagliardi, Jr. | |
| 5,368,520 A | 11/1994 | Koch et al. | |
| 5,370,573 A | 12/1994 | Warren et al. | |
| 5,378,194 A | 1/1995 | Hjorth | |
| 5,464,368 A * | 11/1995 | White et al. | 452/149 |
| 5,466,186 A | 11/1995 | Hjorth | |
| 5,482,502 A | 1/1996 | Hjorth | |
| 5,492,502 A | 2/1996 | Hjorth | |
| 5,525,103 A * | 6/1996 | White et al. | 452/149 |

(Continued)

OTHER PUBLICATIONS

University of Nebraska Lincoln, Pork.org Porcine Myology, http://porcine.unl/edu/porcine2005/pages/index.jsp?what=crossectionD &sectionName=oo, last accessed Apr. 30, 2012.

(Continued)

*Primary Examiner* — Richard Price, Jr.
(74) *Attorney, Agent, or Firm* — McAfee & Taft

(57) ABSTRACT

A method of cutting a pork loin creating an anterior portion, a center portion, and posterior portion of a pork loin to provide pork products having enhanced value. The method includes cutting an anterior portion of a pork loin to form a first portion and a second portion, the first portion including a substantially intact spinalis dorsi and multifidus muscles, and a substantially intact longissimus dorsi in the second portion. The method also includes cutting a posterior portion of a pork loin in a manner that results in a substantially intact gluteus medius muscle such that the resulting pork product resembles a pork loin filet in appearance and shape.

20 Claims, 5 Drawing Sheets

(56) References Cited

U.S. PATENT DOCUMENTS

| | | | |
|---|---|---|---|
| 5,591,076 A | 1/1997 | Evers et al. | |
| 5,746,649 A * | 5/1998 | Skaar et al. | 452/172 |
| 5,779,532 A | 7/1998 | Gagliardi, Jr. | |
| 5,951,392 A * | 9/1999 | Gagliardi | 452/125 |
| 5,976,608 A | 11/1999 | Gagliardi, Jr. | |
| 6,155,919 A * | 12/2000 | Haagensen et al. | 452/171 |
| 6,238,281 B1 | 5/2001 | Gagliardi, Jr. | |
| 6,248,013 B1 | 6/2001 | Thomas et al. | |
| 6,280,311 B1 * | 8/2001 | Kuck | 452/135 |
| 6,319,110 B1 | 11/2001 | Peters et al. | |
| 6,572,467 B1 | 6/2003 | Hirokane | |
| 6,688,961 B2 | 2/2004 | Smith | |
| 6,769,977 B2 * | 8/2004 | Kuck | 452/135 |
| 6,921,326 B2 | 7/2005 | Smith | |
| 6,929,541 B2 | 8/2005 | Cervantes et al. | |
| 7,004,830 B2 | 2/2006 | van der Steen et al. | |
| 7,022,007 B2 | 4/2006 | Naehring et al. | |
| 7,022,077 B2 * | 4/2006 | Mourad et al. | 600/449 |
| 7,134,958 B2 | 11/2006 | Gagliardi, Jr. | |
| 7,175,517 B1 | 2/2007 | Weakley | |
| 7,473,166 B2 * | 1/2009 | Sbarro | 452/135 |
| 7,479,296 B2 | 1/2009 | Gagliardi, Jr. | |
| 7,857,687 B2 | 12/2010 | Gagliardi, Jr. | |
| 7,867,069 B2 | 1/2011 | Gagliardi, Jr. | |
| 8,187,061 B2 * | 5/2012 | Lobel | 452/157 |
| 8,348,730 B2 * | 1/2013 | Lobel | 452/174 |
| 2005/0123664 A1 | 6/2005 | Gagliardi, Jr. | |

OTHER PUBLICATIONS

University of Nebraska Lincoln, Pork.org Porcine Myology, http://porcine.unl.edu/porcine2005/pages/index.jsp?what=crossectionD&sectionName=pp, last accessed Apr. 30, 2012.

University of Nebraska Lincoln, Pork.org Porcine Myology, http://porcine.unl.edu/porcine2005/pages/index.jsp?what=crossectionD&sectionName=p, last accessed Apr. 30, 2012.

* cited by examiner

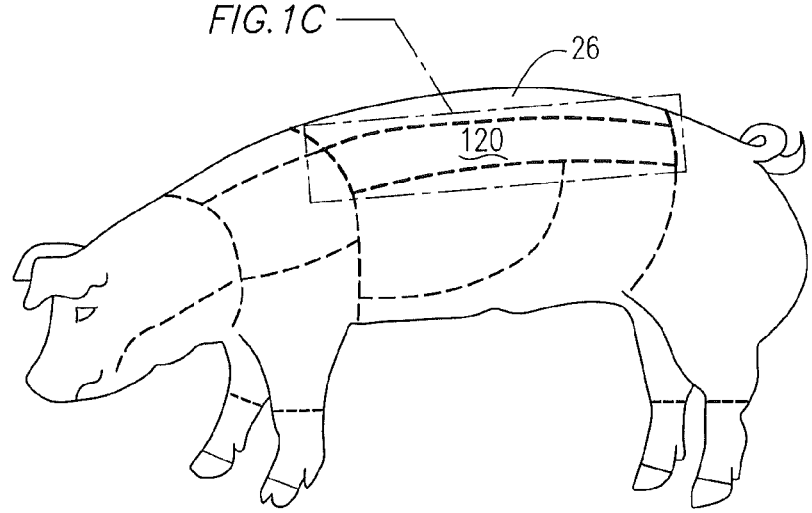
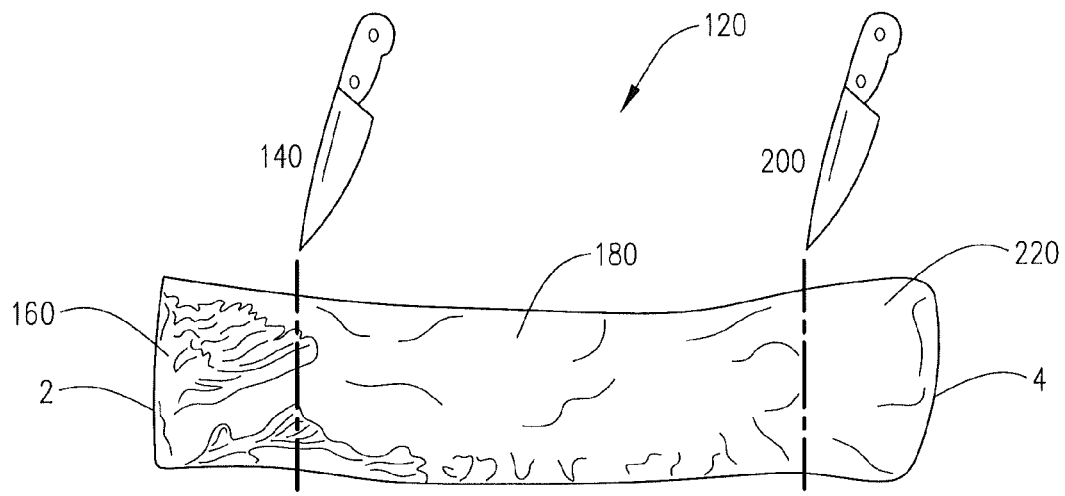

METHOD OF CUTTING A PORK LOIN

BACKGROUND OF THE INVENTION

In the past, pigs at the time of slaughter weighed approximately 250 pounds, on average. Pigs have increased in size, and today, pigs at the time of slaughter tend to weigh approximately 285 pounds-300 pounds, on average. An increased pig carcass weight correlates to an increase in muscle development and increased muscle size in the pig carcass. Due to the increase in pig size, there is a need for new, effective, and efficient ways to utilize these larger, more developed muscles of the pig carcass.

As a result of producing center cut boneless pork loins, there is an overabundance of anterior portions of boneless pork loins. The complete anterior end of the boneless pork loin is primarily composed of the spinalis dorsi and longissimus dorsi muscles. Products have been developed using the complete anterior end of the boneless pork loin. However, the products have been less preferred by the consuming public due to the unappetizing and aesthetically displeasing two-tone coloration between the longissimus dorsi muscle, generally light colored due to a low myoglobin content, and the spinalis dorsi muscle, generally red-toned (dark colored) due to high myoglobin content. As a result, products comprised of the entire anterior end of the boneless pork loin tend to be marketed at a reduced value compared to a center cut pork loin.

In addition, products using the posterior portion of boneless pork loins, for example, boneless sirloin, have been less preferred by consumers due to a non-uniform appearance of the products in their cooked state. The cause of the non-uniform appearance of a pork sirloin is the presence of at least three differing types of muscle tissues, the gluteus accessorius, tensor fasciae latae, and gluteus medius muscles. As a result of this non-uniform appearance, the pork products must often be sold at lower prices than the uniform appearing pork loin.

The consuming public is reluctant to buy a pork product not having an appetizing and/or aesthetically pleasing uniform color appearance, either uncooked or cooked.

Therefore, there is a need for new cutting techniques for effective and efficient utilization of the pig carcass and cutting of the pig carcass that result in meat products that are appetizing and/or aesthetically pleasing, and have desirable portion sizing to the consuming public. Furthermore, there is a need for new cutting techniques of pork loins that result in separate meat products that are each more valuable as separate pieces than the current meat products.

SUMMARY OF THE INVENTION

A method of cutting a pork loin is disclosed. The method includes separating the pork loin into an anterior portion, a center portion, and a posterior portion. The center portion consists essentially of a longissimus dorsi, a multifidus dorsi, and iliocostalis dorsi muscles of the pork loin.

The anterior portion consists essentially of a substantially intact spinalis dorsi muscle, a substantially intact multifidus dorsi muscle and a substantially intact longissimus dorsi muscle of the pork loin and the intermuscular seam that separates the spinalis dorsi muscle and the longissimus dorsi muscle in the pork loin. The method includes dividing the anterior portion into a first portion consisting essentially of the substantially intact spinalis dorsi muscle and the substantially intact multifidus dorsi muscle and a second portion consisting essentially of the substantially intact longissimus dorsi muscle. The anterior portion is divided into the first and second portions along the intermuscular seam. The method also includes trimming the first portion and the second portion to remove any undesirable components and materials.

The posterior portion consists essentially of a gluteus superficialis muscle, a gluteus medius muscle, a gluteus accessorius muscle, a gluteus profundus muscle, an obturator internus muscle, and a tensor fasciae latae muscle of the pork loin. After removal of the obturator internmus, and gluteus superficialis, the method includes removing the gluteus accessorius muscle, the gluteus profundus muscle, seams associated with said gluteus accessorius muscle and said gluteus profundus muscle, butt cord, and undesirable components from the posterior portion of the pork loin. The method also includes removing a tensor fasciae latae muscle and seams associated with said tensor fasciae latae muscle from the posterior portion of the pork loin thereby causing the posterior end of the pork loin to consist essentially of a substantially intact gluteus medius muscle.

BRIEF DESCRIPTION OF THE DRAWINGS

FIG. 1B is an illustration of the primal cuts of a pig.
FIG. 1C is an exemplary view of the cuts of the pork loin depicting an anterior portion, center portion, and posterior portion of the pork loin.

DETAILED DESCRIPTION

Figure 1A:
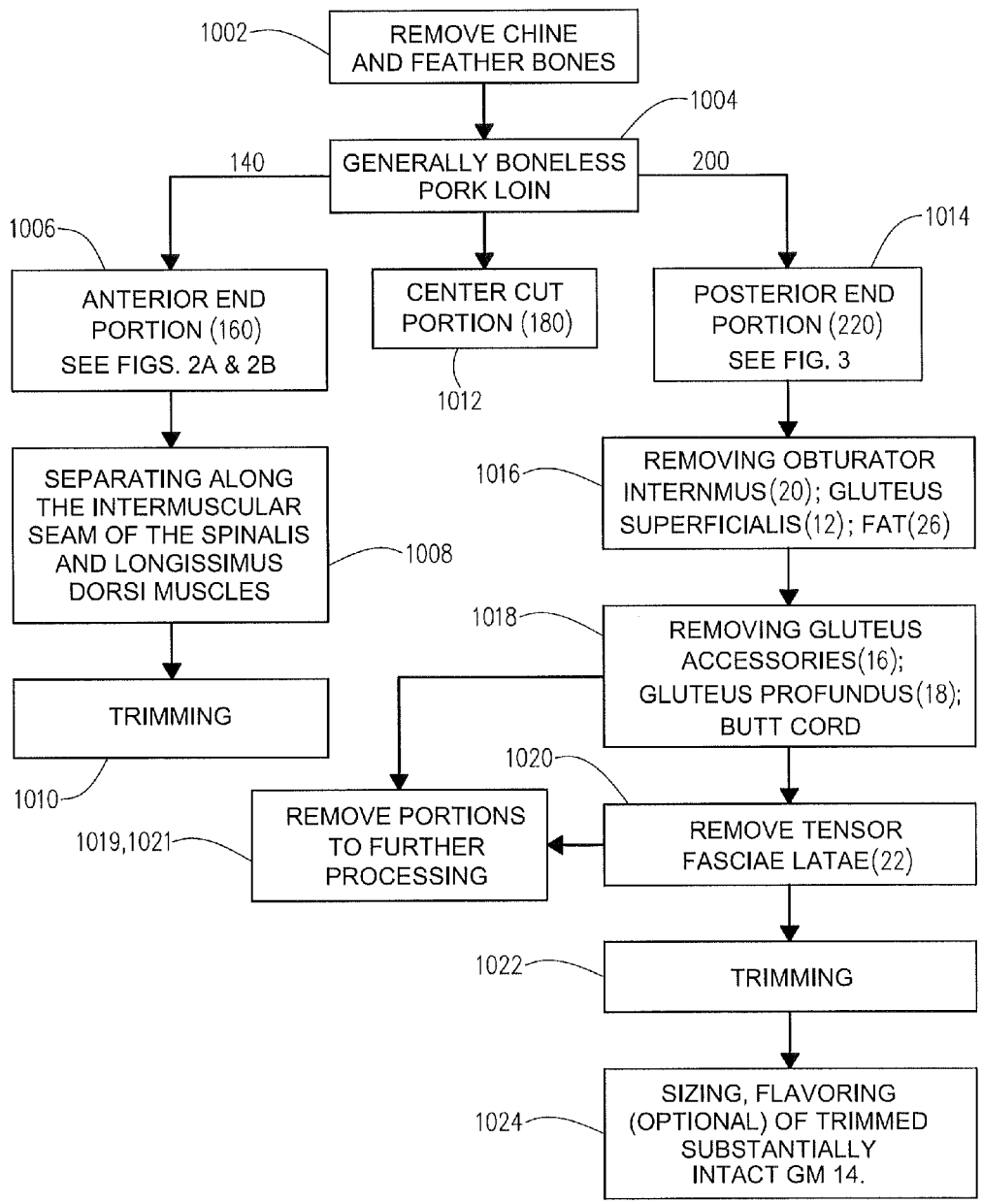
FIG. 1A is a block diagram illustrating the method.

Referring to the drawings, the inventive method is illustrated and generally designated as numeral 1000. FIG. 1A depicts a block diagram of method 1000. Method 1000 provides a method for cutting a pig carcass, for example, the loin portion 120 of a pig carcass.

The pork loin 120 referred to herein and shown in FIGS. 1B and 1C, is the resultant piece of cutting a pig carcass, not shown, into its primal cuts and deboning those portions (e.g. removal of the chine and feather bones shown in block 1002 in FIG. 1A) resulting in a generally boneless pork loin.

As used herein, the generally boneless pork loin has been deboned in prior processing, not depicted, as well as in block 1002 where the chine bones, feather bones, backribs, riblets, button bones, and a large portion of the scapula and ilium bones are removed. The resulting generally boneless pork loin in block 1004 has minimal bones within the loin, for example, a portion of the button bones, scapula, and a portion of the ilium bone 24 are present.

Referring to FIG. 1A, the steps of separating the pork loin 120 involve cutting. Cutting includes separating the portions of pork loin 120, removing the portions of boneless pork loin 120, severing the portions of boneless pork loin 120, or other similar descriptions. Cutting is achieved by any method used in the industry, including but not limited to, automated or manual cutting via manual and/or mechanized efforts including, but not limited to: a knife or knives; rotary knives; band saws; shears; and combinations thereof.

After the removal of the chine and feather bones in block 1002, the resultant pork loin portion is a generally boneless pork loin in block 1004. The generally boneless pork loin 120 is positioned in a cutting area. Examples of a cutting area include, a cutting surface; hanging devices; graspers, or other devices suitable for securing, supporting, and/or holding loin 120 to achieve the desired cuts. For example, the cutting surface may be any surface known in the art suitable to achieve the desired cuts—the generally boneless loin 120 is positioned on: a conveyor or moving surface; a stationary surface, or combinations thereof.

In the past, the generally boneless loin 120 weighed approximately 9.0 pounds to approximately 9.5 pounds; due to the increase in pig carcass weight, loin 120 generally weighs approximately 10.0 pounds to approximately 11.5 pounds. From block 1004, cuts 140 and 200 are made on generally boneless pork loin 120 thereby resulting in an anterior end piece or anterior portion 160 in block 1006; a center cut piece or center portion 180 in block 1012; and a posterior end piece or portion 220 in block 1014. FIG. 1C illustrates cuts 140 and 200 and the resulting anterior portion 160, center cut portion 180, and posterior portion 220. As shown in FIG. 1C, loin 120 has an anterior edge 2 and a posterior edge 4. The center portion includes portions of the longissimus dorsi, the multifidus dorsi, and the iliocostalis dorsi muscles of the pork loin. Further processing on the center portion 180 can be done, such as fresh cutting for retail display, not depicted.

As used herein, consisting essentially of a specific muscle or group of muscles refers to the muscle plus the seams 6 associated with the muscle(s) and possibly also minor proportions, approximately less than or equal to 5% of other muscles and pig carcass materials. Pig carcass materials includes, all materials, fluids, and bone fragments of the pig carcass. As used herein, undesirable components include any material or component that may affect the uniform and appetizing appearance of the meat product to consumers or that may adversely affect a pleasant culinary experience (including purchase presentation, preparation, and eating) by the consumer. Examples of undesirable components include material or features such as fat 26, blood clots, bruises, bone chips, cartilage, intermuscular seams 6, and/or extraneous material present on the meat due to the cutting process, such as, but not limited to, bone fragments that fall on the meat during deboning. As used herein, associated seams 6 includes membranes, and/or connective tissue including intermuscular seams.

As used herein, substantially intact refers to the muscle within a particular portion of interest. The substantially intact muscle has approximately 50% or above of the initial muscle material present in that portion of the loin intact. The amount of muscle material present in substantially intact muscle is not based on a percentage of the total muscle material for the particular present in the entire pig carcass.

For illustrative purposes, the longissimus dorsi muscle 60 is present in both the anterior portion 160 and the center portion 180 of loin 120. The substantially intact longissimus dorsi muscle discussed in reference to anterior portion 160 refers to the percentage of longissimus dorsi muscle 60 present during and at the completion of method 1000 based on the initial or starting muscle material of the longissimus dorsi muscle 60 present in the anterior portion 160 as a result of cut 140.

Figure 2A:
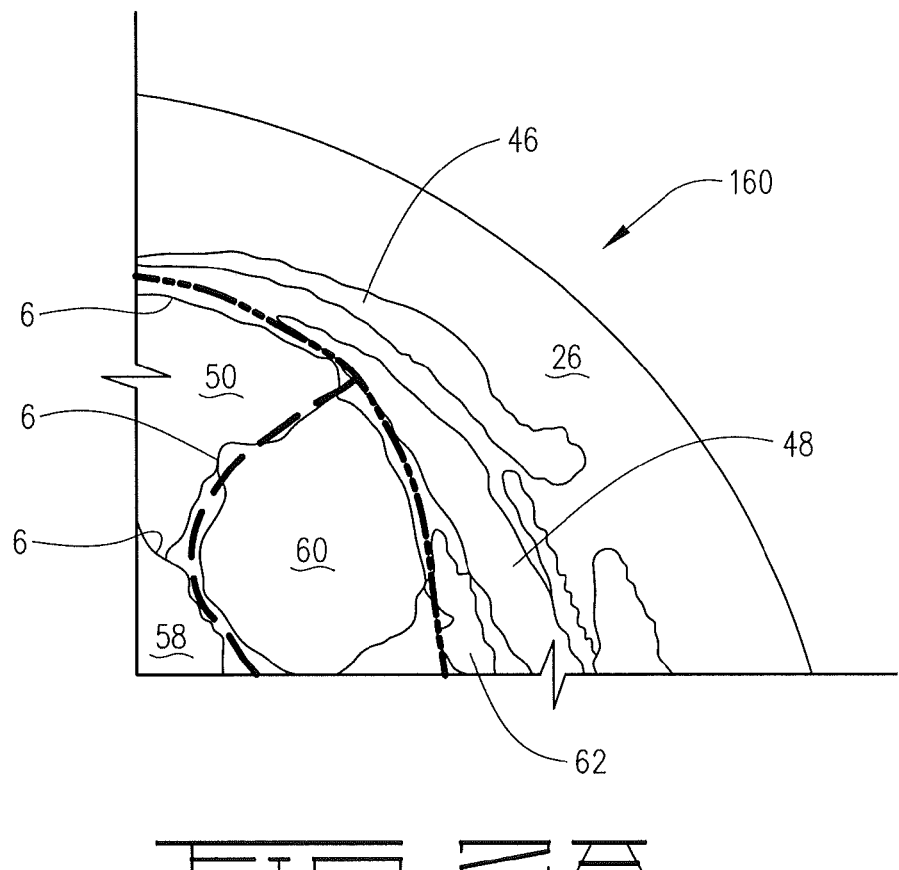
FIG. 2A is a cross sectional view of the anterior portion.
Figure 2B:
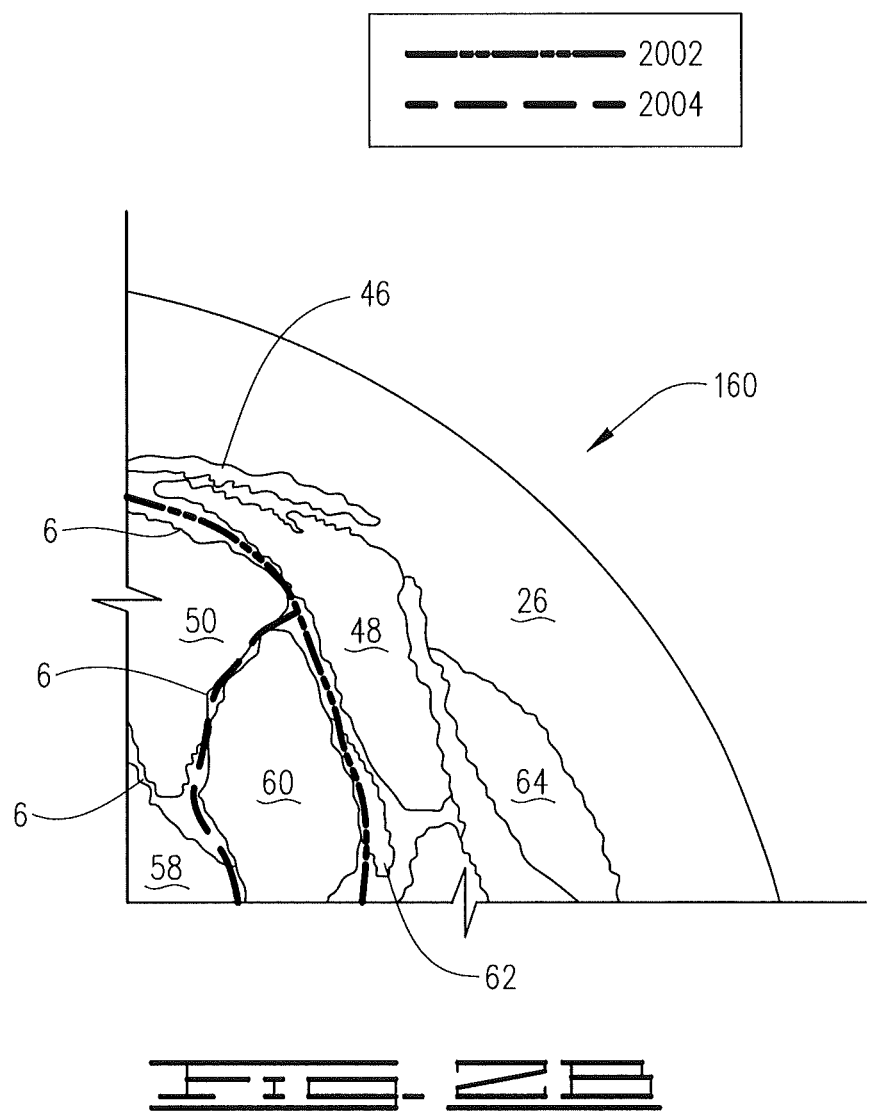
FIG. 2B is another cross sectional view of the anterior portion.

Referring to FIGS. 1A and 1C, cut 140 is made on the loin 120 to separate anterior portion 160 from the loin. Cut 140 is made approximately from the second rib to the fifth rib or approximately at least 4 inches and up to about 8 inches from the anterior edge 2 of boneless pork loin 120. As previously discussed, loin 120 is generally deboned, thus use of the approximate location of cut 140 with reference to the ribs are based on where the ribs would be located had the ribs not previously been removed from loin 120. As shown in FIGS. 2A and 2B, the anterior portion 160 is composed of a substantially intact spinalis dorsi muscle 50, a substantially intact longissimus dorsi muscle 60, and a substantially intact multifidus dorsi 58 muscle. Line 2002 illustrates one embodiment for cutting the anterior portion 160 to yield a cut of meat containing a substantially intact spinalis dorsi muscle 50, a substantially intact longissimus dorsi muscle 60, and a substantially intact multifidus dorsi muscle 58.

Also depicted in the cross section of FIGS. 2A and 2B are the trapezius muscle 46, the rhomboideus muscle 48, and the serratus dorsalis muscle 62. In alternative embodiments portions of the trapezius muscle 46, the rhomboideus muscle 48, or the serratus dorsalis muscle 62, and combinations thereof, are completely removed from the anterior portion. In other embodiments, portions of the trapezius muscle 46, the rhomboideus muscle 48, or the serratus dorsalis muscle 62, and combinations thereof, are present in anterior portion 160. The amount of material of the trapezius muscle 46, the rhomboideus muscle 48, or the serratus dorsalis muscle 62 present at the completion of method 1000 is approximately up to about or equal to 15% of initial muscle material for each of the trapezius muscle 46, rhomboideus muscle 48, and serratus dorsalis muscle 62 present in anterior portion 160 as a result of cut 140.

Represented as line 2004 in FIGS. 2A and 2B, the spinalis dorsi muscle 50 and multifidus dorsi muscle 58 are separated from the longissimus dorsi muscle 60 along the intermuscular seam 6 dividing the spinalis dorsi muscle 50 and longissimus dorsi muscle 60, thereby forming first and second portions. The first portion consisting essentially of the substantially intact spinalis dorsi 50 and substantially intact multifidus dorsi 58 muscles. The second portion consisting essentially of a substantially intact longissimus dorsi 60 muscle.

Method 1000, also includes trimming the first and second portions to remove undesirable components. The trimming step also provides the resultant separate pieces weigh approximately 6 ounces to approximately 24 ounces for the first portion and approximately 8 ounces to approximately 22 ounces for the second portion. As should also be recognized by those skilled in the art, quality assurance, customer, and/or consumer requirements may lead to further modification and cutting of the first and second portions of anterior portion 160.

Method 1000 allows for the separation of the spinalis dorsi and longissimus dorsi muscles thereby allowing utilization of both muscles in the same or different applications and/or meat products. For example, the first portion, the substantially intact spinalis dorsi 50 and multifidus dorsi 58 muscles, are very tender and tend to exhibit great culinary attributes; e.g. the ability to accept seasoning or flavoring, cook evenly, appear uniform in color and texture in both uncooked and cooked states. The second portion, the substantially intact longissimus dorsi 60 muscle can be utilized in other manufacturing processes or meat products; for example the substantially intact longissimus dorsi 60 muscle is suitable for the manufacture of Canadian bacon as a result of increased demand for Canadian bacon.

Figure 3:
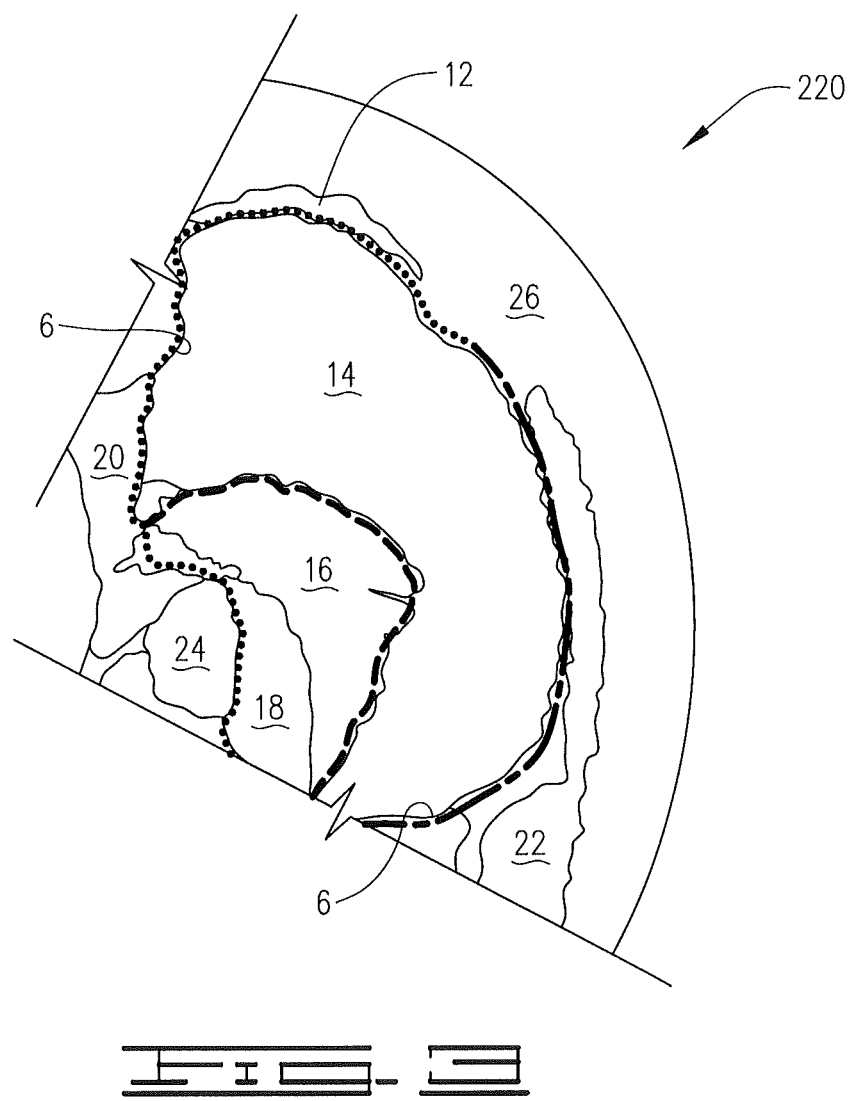
FIG. 3 is a cross sectional view of the posterior portion.

Referring to FIGS. 1A and 1C, the posterior portion 220 is separated from the center portion 180 along cut 200. FIG. 3 depicts a cross-sectional view of posterior portion 220. The posterior portion 220 includes the gluteus complex, comprising the gluteus superficialis (GS) muscle 12, gluteus medius (GM) muscle 14, gluteus accessorius (GA) muscle 16, gluteus profundus (GP) muscle 18, the obturator internus (OI) muscle 20, and tensor fasciae latae (TFL) muscle 22. The TFL 22 runs the entire length of the pig carcass. As a result of cut 200, posterior portion 220 weighs approximately greater than or equal to 2.1 pounds and less than or equal to approximately 3.0 pounds.

At block 1016 the OI 20, GS 12, and any fat 26 beyond about ⅛ inch thickness is removed. For illustration purposes, line 2006 in FIG. 3 shows one embodiment of performing these cuts. As a result of the cutting in block 1016 the ilium bone 24 is also removed. The resulting portion of the posterior end piece 220 is commonly referred to and marketed as a retail boneless sirloin roast. This retail boneless sirloin roast includes the GM 14, GA 16, GP 18, TFL 22, butt cord, not depicted, and other intermuscular seams.

At block 1018, the GA 16, GP 18, associated seams, butt cord, and other undersirable muscle and pig carcass components from the posterior portion are removed. In FIG. 3, line 2008 represents one embodiment illustrating this cut. The removed portions are set aside for further processing, as shown by block 1019. In particular, due to increase market demands and increased size of the pig carcasses, these removed portions are suitable for use by industries or in applications requiring a higher lean content, for example approximately 90% lean content or greater. Such applications and industries include, for example, sausage manufacturers, for manufacturing pepperoni and other toppings.

The method proceeds to block 1020 where TFL 22 is removed. Line 2010 in FIG. 3 is an example of the cut used to remove TFL 22. The removed materials in block 1020 are set aside for further processing, as shown by block 1021. These removed materials are suitable for use in industries and applications requiring a lower lean content, for example approximately about a 72% lean content, such as, for example hot dogs, and other sausage manufacturing.

Trimming of the posterior portion of undesirable components and/or undesirable features is done in block 1022.

As a result of steps 1018, 1020, and 1022 a substantially intact GM muscle 14 remains. The substantially intact GM muscle 14 resembles a pork loin filet in shape and appearance and weighs approximately greater than or equal to 1.2 pounds and are less than or equal to 2.0 pounds. Other modifications to the substantially intact GM muscle 14 may be done, for example, further trimming, sizing, flavoring or seasoning of the meat, or other quality assurance inspections prior to packaging may occur in block 1024.

As used herein, sizing refers to the cutting, trimming, molding, forming, and combinations thereof, of the muscle to achieve a desired weight and/or physical dimension.

Due to the appearance of a pork loin filet, a product having a higher value composed of the GM muscle 14 can be marketed and sold at a higher value as well. Again, this use of a single muscle void of connective tissue or other undesirable features allows a consumer to obtain a better culinary experience since the meat is better able to accept seasoning and marinade uniformly as opposed to inconsistently in multi-muscle meat products having varying tissue characteristics. Further, use of a single muscle allows the resulting meat to have better aesthetic appearance due to single tone coloring, e.g. consistent or more uniform myoglobin content.

Use of similar muscles having similar texture and coloring or a single muscle void of connective tissue or other undesirable features allows a consumer to obtain a better culinary experience. For example, a single muscle is able to accept seasoning and marinade uniformly as opposed to inconsistently in multi-muscle meat products where the multi-muscle product contains muscles having dissimilar texture and/or myoglobin content. Connective tissues and other undesirable features also impact the consumer's culinary experience due to varying cook times, taste and/or texture.

The resultant pork pieces of method 1000 are appetizing and aesthetically pleasing to the consuming public. The resultant pork pieces exhibit uniform color. Each separate meat piece results in a meat product that is more valuable as a separate piece due to various market reasons, thereby causing enhanced value to the resulting pork product. Some market reasons for the increase in value of the individual pieces include shortages of various pork products—this inventive method provides an avenue to address shortages while also allowing a cost effective and material effective solution to practice this inventive method.

Those skilled in the art will recognize that as a result of processing of the pig carcass and due to variations among pig carcass anatomies, some incidental muscles not discussed herein may be present within the cross sections as depicted in the figures. Those skilled in the art will recognize that in practicing the claimed method, the incidental muscles may ultimately be removed or may be present in an amount of approximately less than or equal to 5% of the muscle for a particular portion of interest, e.g. anterior portion, center portion, and/or posterior portion.

Other embodiments of the current invention will be apparent to those skilled in the art from a consideration of this specification or practice of the invention disclosed herein. Thus, the foregoing specification is considered merely exemplary of the current invention with the true scope thereof being defined by the following claims. Thus, the present invention is well adapted to carry out the objects and attain the ends and advantages mentioned and alluded to, as well as those which are inherent therein.

What is claimed is:

1. A method of cutting a posterior portion of a boneless pork loin, wherein the posterior portion includes a gluteus medius muscle, a gluteus accessorius muscle, a gluteus profundus muscle, a tensor fasciae latae muscle, and a butt cord, the method comprising:
    (a) removing the gluteus accessorius muscle, the gluteus profundus muscle, seams associated with said gluteus accessorius muscle and said gluteus profundus muscle, said butt cord, and undesirable components from the posterior portion of the boneless pork loin;
    (b) after step (a), removing the tensor fasciae latae muscle and seams associated with said tensor fasciae latae muscle from the posterior portion of the boneless pork loin thereby causing the posterior portion of the pork loin to consist essentially of a substantially intact gluteus medius muscle.

2. The method of claim 1, further comprising the step of:
    (c) after step (b), trimming the substantially intact gluteus medius muscle to remove undesirable components therefrom.

3. The method of claim 2, further comprising the step of:
    (d) after step (c), sizing the substantially intact gluteus medius muscle.

4. The method of claim 3, wherein after step (d), said sized substantially intact gluteus medius muscle is seasoned.

5. The method of claim 2, wherein the trimmed substantially intact gluteus medius muscle resembles a pork loin filet in shape and appearance.

6. The method of claim 2, wherein said trimmed substantially intact gluteus medius muscle remaining after step (c) weighs in the range of from about 1.2 pounds to about 2.0 pounds.

7. The method of claim 1, wherein steps (a) and (b) are all performed by hand cutting with a knife.

8. The method of claim 1, wherein before step (a) the posterior portion of the boneless pork loin weighs in the range of from about 2.1 pounds to about 3.0 pounds.

9. A method of cutting a pork loin, said pork loin having an anterior edge and a posterior edge, the method comprising:

(a) removing an anterior portion from the pork loin, said anterior portion consisting essentially of a substantially intact spinalis dorsi muscle, a substantially intact multifidus dorsi muscle and a substantially intact longissimus dorsi muscle, wherein said substantially intact spinalis dorsi muscle and said substantially intact longissimus dorsi muscle are connected together by an intermuscular seam; and (b) dividing said removed anterior portion into a first portion consisting essentially of the substantially intact spinalis dorsi muscle and the substantially intact multifidus dorsi muscle and a second portion consisting essentially of said substantially intact longissimus dorsi muscle, said removed anterior portion being divided into said first and second portions along said intermuscular seam.

10. The method of claim 9, wherein said anterior portion is removed from the boneless pork loin in step (a) by cutting said pork loin at a point that is up to about 8 inches from the anterior edge of the pork loin.

11. The method of claim 9, wherein said anterior portion is removed from the boneless pork loin in step (a) by cutting said pork loin at a point that is up to about 4 inches from the anterior edge of the pork loin.

12. The method of claim 9, further comprising trimming said first and second portions to remove undesirable components therefrom.

13. A method of cutting a pork loin, said pork loin having an anterior edge and a posterior edge, the method comprising:
(a) separating the pork loin into an anterior portion, a center portion, and a posterior portion, such that:
(i) said anterior portion consists essentially of a substantially intact spinalis dorsi muscle, a substantially intact multifidus dorsi muscle, and a substantially intact longissimus dorsi muscle, wherein said substantially intact spinalis dorsi muscle and said substantially intact longissimus dorsi muscle are connected together by an intermuscular seam; and
(ii) said posterior portion consists essentially of a gluteus superficialis muscle, a gluteus medius muscle, a gluteus accessorius muscle, a gluteus profundus muscle, an obturator internus muscle, a tensor fasciae latae muscle; and a butt cord;
(b) removing the gluteus accessorius muscle, the gluteus profundus muscle, seams associated with said gluteus accessorius muscle and said gluteus profundus muscle, said butt cord, and undesirable components from the separated posterior portion of the pork loin;
(c) after step (b) removing the tensor fasciae latae muscle and seams associated with said tensor fasciae latae muscle from the separated posterior portion of the pork loin thereby causing the separated posterior portion of the pork loin to consist essentially of a substantially intact gluteus medius muscle;
(d) after step (c), trimming the substantially intact gluteus medius muscle to remove undesirable components therefrom;
(e) after step (d), sizing the substantially intact gluteus medius muscle;
(f) dividing said separated anterior portion into a first portion consisting essentially of said substantially intact spinalis dorsi muscle and said substantially intact multifidus dorsi muscle and a second portion consisting essentially of said substantially intact longissimus dorsi muscle, said anterior portion being divided into said first and second portions along said intermuscular seam between said substantially intact spinalis dorsi muscle and said substantially intact longissimus dorsi muscle;
(g) trimming said first portion and said second portion to remove undesirable components therefrom.

14. The method of claim 13, wherein steps (a) through (g) are all performed by hand cutting with a knife.

15. The method of claim 13, wherein said trimmed substantially intact gluteus medius muscle remaining after step (d) weighs in the range of from about 1.2 pounds to about 2.0 pounds.

16. The method of claim 13, wherein said trimmed substantially intact gluteus medius muscle remaining after step (d) resembles a pork loin filet in shape and appearance.

17. The method of claim 13, wherein after step (a) the posterior portion of the pork loin weighs in the range of from about 2.1 pounds to about 3.0 pounds.

18. The method of claim 13, wherein said sized substantially intact gluteus medius muscle is seasoned.

19. The method of claim 13, wherein said anterior portion is separated from the pork loin in step (a) by cutting said pork loin at a point that is up to about 8 inches from said anterior edge of the pork loin.

20. The method of claim 13, wherein steps (b)-(e) and steps (f)-(g) are performed simultaneously.

* * * * *